United States Patent
Edelson et al.

[11] 3,958,107
[45] May 18, 1976

[54] FUEL MANAGEMENT COMPUTER

[76] Inventors: Andrew C. Edelson, 10832 Charnock Road, Los Angeles, Calif. 90034; Soulie Levine, 131 N. Hamilton Drive, Suite 203, Beverly Hills, Calif. 90211

[22] Filed: Dec. 9, 1974

[21] Appl. No.: 530,818

[52] U.S. Cl............................ 235/150.21; 235/150.2; 307/141; 340/309.4
[51] Int. Cl.² .................... G06F 15/50; B64D 37/14
[58] Field of Search.................... 235/150.2, 150.21; 340/309.1, 309.4; 307/141, 293

[56] References Cited
UNITED STATES PATENTS

| | | | |
|---|---|---|---|
| 3,430,222 | 2/1969 | Gratrix et al. | 340/309.1 |
| 3,610,966 | 10/1971 | Barber | 307/293 |
| 3,636,549 | 1/1972 | Berman et al. | 340/309.1 |
| 3,662,186 | 5/1972 | Karklys | 307/141 |
| 3,697,879 | 10/1972 | Holliday | 307/293 |
| 3,721,908 | 3/1973 | Jurjans | 307/293 |

OTHER PUBLICATIONS

Bergeson: C G Control Copes with Shifting Fuel, Control Engineering, Apr. 1955, pp. 80, 81, 83.

*Primary Examiner*—Felix D. Gruber

[57] ABSTRACT

An aircraft fuel management computer for notifying a pilot at a predetermined point of time to switch the fuel selector valve to begin draining fuel from a different fuel tank. A frequency divider provides a logic level at the end of time segments, each having a predetermined length, which are transmitted through an automatic/manual count circuit to activate a decoder to provide output logic levels each of which is coupled to the associated stages of a plurality of automatic program switches each preset to a position corresponding to a predetermined number of time segments. Each of the automatic program switches is coupled to a mode switch which may be set to one of the automatic program switches to time the usage of one of the fuel tanks of the aircraft for a period of time corresponding to the setting of the automatic program switch. The mode switch is coupled to reset means and alarm means so that at the end of the time segments determined by the setting of the automatic program switch to which the mode switch is set, the alarm is activated to notify the pilot to switch the mode switch to the next automatic program switch which causes the frequency divider to be reset and switch the fuel selector valve to begin using a different fuel tank. The automatic/manual count circuit has means to provide manual incrementing of the decoder. LED (light emitting diode) means provide a real time display of the setting of the mode switch and the time segment of the automatic program switch to which the mode switch is set. A final mode switch is operative in conjunction with final mode circuitry to initiate a final mode function to provide a display on the LEDs and activate the alarm to notify the pilot that the final mode has expired and the pilot is travelling on reserve fuel. The final mode switch has sufficient flexibility to initiate the final mode function either at the end of the time segments corresponding to the setting of a predetermined one of the intermediary automatic program switches or at the end of the time segments corresponding to the setting of the last program switch.

28 Claims, 5 Drawing Figures

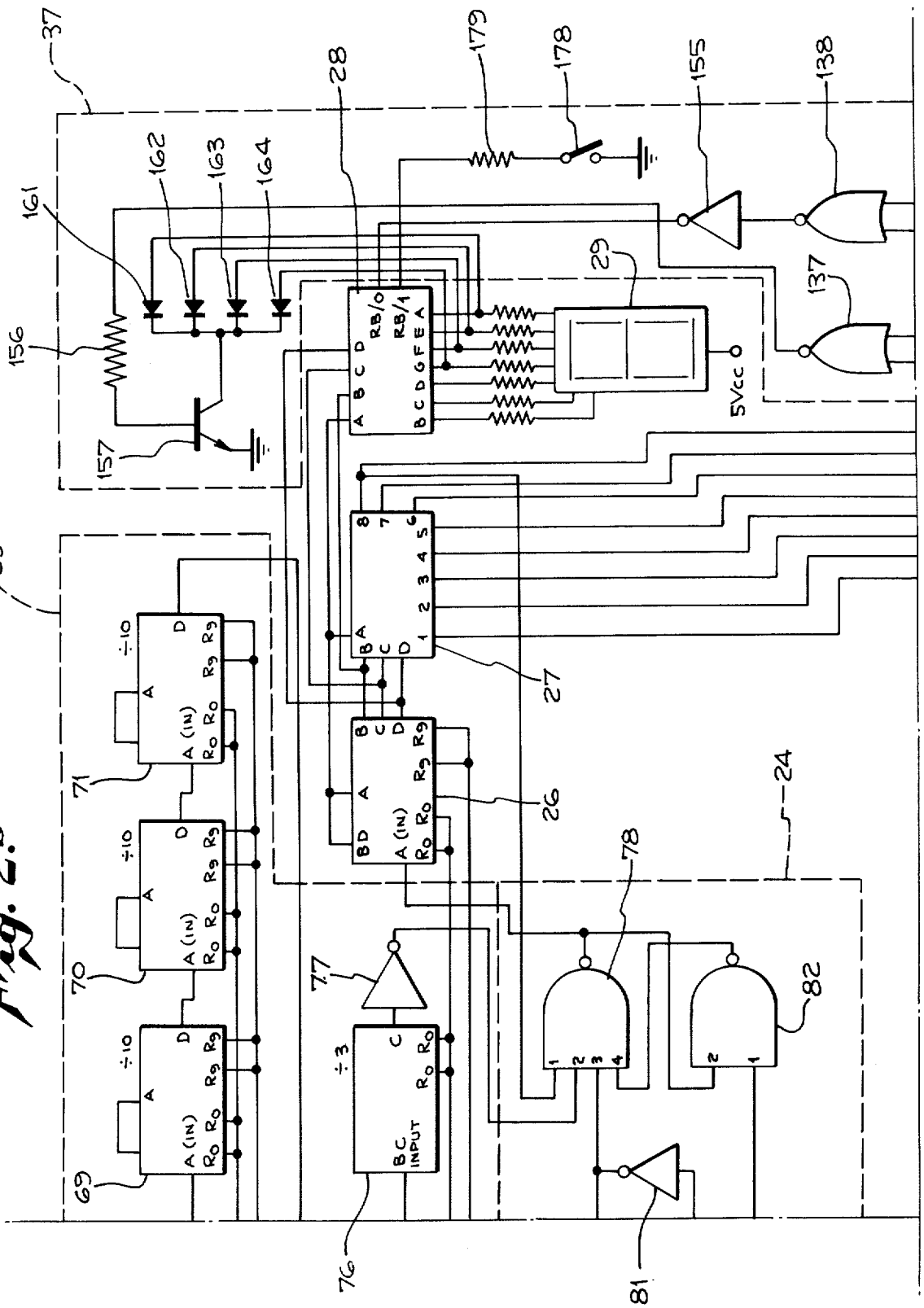
Fig. 2.b

FUEL MANAGEMENT COMPUTER

BACKGROUND OF THE INVENTION

The present invention relates to a fuel management computer for an aircraft and more particularly to a preprogrammed timing mechanism for notifying a pilot when to adjust the fuel selector valve to begin using a different fuel tank.

Recent studies of aircraft accidents indicate that fuel starvation was a cause or related factor in a substantial number of cases. The most frequently cited causes of fuel starvation include exhaustion of fuel from the tank in use while ample fuel for continued operation remained in other tanks on the aircraft and incorrect positioning of the fuel selector valve.

Often, if a pilot forgets to switch fuel tanks before the tanks are exhausted, the engine may not be restarted in sufficient time to prevent an accident. Aircraft manufacturers have become greatly concerned about the apparent lack of attention to fuel supply which is apparent from the number of accidents resulting from the exhaustion of one tank of fuel while ample fuel remained in another tank on the aircraft. One solution to the problem is better education of pilots about fuel management. Various manufacturers, however, have indicated a substantial need for a low-fuel warning device which could be used to alert a pilot of impending fuel starvation.

The problem of fuel starvation is particularly acute in single engine and twin engine airplanes. Generally speaking, single engine planes have two fuel tanks and twin engine planes have four fuel tanks. The fuel tanks are located on the left and right wings of the plane. The pilot may operate a fuel selector valve to select which of the tanks is to be used for supplying fuel to the engine at any given point of time during the flight.

In the case of a single engine aircraft having two fuel tanks, in order to maintain proper balance of the aircraft in flight, it is necessary to draw fuel from one tank and, after a predetermined period of flying time, switch the fuel selector valve to draw fuel from the second tank. After a third predetermined period of flying time, the pilot must turn the fuel selector valve back to the first tank and leave it there for the remainder of the flight. The Federal Aviation Agency requires that an airplane must land with a 45 minute reserve of fuel when flying IFR (instrument flight rules) and a 30 minute reserve of fuel when flying VFR (visual flight rules). In order for a pilot to properly manage the fuel of a single engine aircraft to maintain proper balance of the aircraft in flight, as well as comply with the FAA regulations, it has been found desirable to draw fuel from a single engine - two- tank airplane having a total flying time of 4 ½ hours in three modes.

The first mode for a two-tank system provides for the withdrawal of fuel from the first tank for 0.75 hours to allow a reserve of fuel in the tank for flying 3.75 hours. In the second mode, the fuel selector valve may be switched to draw fuel from the second tank for 2 hours. In the third and last mode, the fuel selector valve may be switched back to the first tank to draw fuel from it for the remaining 1 hour of the flight. The management of the fuel in these three modes allows the pilot to land with an amount of fuel provided for by the FAA regulations. The tabulations of the three modes in this example is as follows:

SINGLE ENGINE — TWO TANK SYSTEM 4.5 Hours total flying time minus 45 minutes for maximum reserve 3.75 actual flying time
  Mode 1 . . . . fly on left tank for 0.75 hours
  Mode 2 . . . . fly on right tank for 2 hours
  Mode 3 . . . . fly on left tank for remaining 1 hour landing with 45 minute reserve.

A twin engine plane having four fuel tanks generally provides 6.5 hours of flying time. After deducting the maximum of 0.75 hours for reserve (as required by FAA regulations), the remaining flying time of a twin engine plane would be 5.75 hours. The fuel management may be programmed to operate in five modes to maintain proper balance of the plane while preventing the draining of either of the four tanks, each located on opposite wings.

The first mode provides for draining the first tank for 0.75 hours. At the end of the first mode the pilot turns the fuel selector valve to the second tank and uses the second tank for one hour. After the second mode of operation the pilot turns the fuel selector valve to the third tank and uses it for one hour. The pilot then switches the fuel selector valve to the fourth tank and uses it for an hour in the fourth mode. At the end of the fourth mode the pilot turns the fuel selector valve back to the first tank for the remaining one hour of flying time in the fifth mode. At the end of the fifth mode, the pilot may land with 0.75 hours of reserve fuel. A tabulation of the five modes for a two-engine — four-tank system is as follows:

TWIN ENGINE — FOUR TANK SYSTEM 6.5 Hours total flying time minus 45 minutes for maximum reserve 4.75 actual flying time
  Mode 1 . . . . fly on left wing tank for 0.75 hours.
  Mode 2 . . . . fly on right wingtip tank for 1 hour.
  Mode 3 . . . . fly on left wingtip tank for 1 hour.
  Mode 4 . . . . fly on right wing tank for 1 hour.
  Mode 5 . . . . fly on left wing tank for remaining 1 hour landing with 45 minute reserve.

The above exemplary modes of fuel management are important to prevent the aircraft tanks from being drained which would cause the aircraft to crash if the engine were to stop in mid-air and could not be restarted immediately thereafter. In spite of the importance of fuel management, it is usually given lower priority by the pilot in view of the necessity of the pilot to devote his attention to the mechanics of flying the plane, working the instruments, operating the radio communications equipment, navigating the plane, and computing flying time, etc.. Recent sutdies of the FAA and National Safety and Transportation Board indicate that improper fuel management on private aircraft is one of the primary causes of crashes.

Presently, pilots manage fuel by simply using a watch to make mental notes as to when to switch the fuel selector valve. This is obviously a very unsatisfactory technique for fuel management. There are no instruments or systems currently available to the private aircraft pilot that would allow him to completely and automatically preprogram the fuel management modes, such as those described above, to notify him to turn the fuel selector valve at the end of each mode.

SUMMARY OF THE INVENTION

The present invention provides for a fuel management computer wich allows a pilot to completely and automatically preprogram his fuel management modes. The computer has the flexibility to permit programming for a two-tank system using 3 modes or a four-tank system using five modes. At the end of the third mode or at the end of the fifth mode, the computer goes into its final mode function to provide a display and audio signal to the pilot to notify him that the aircraft is travelling on reserve fuel.

To attain the objects of the present invention, the system provides for a plurality of automatic program switches each of which may be set to one of 8 positions. Each of the 8 positions corresponds to a predetermined segment of time such as 15 minutes. A mode switch may be set by the pilot to determine which of the automatic program switches is being used at any point of time for timing purposes.

Initially, the mode switch is set to the first automatic program switch and at the end of the number of segments of time corresponding to the setting of the first automatic program switch, an alarm is sounded which notifies the pilot to switch the fuel selector valve to start drawing fuel out of a different tank. The mode switch is connected to a seven-segment LED (light emitting diode) driver which is connected to a seven-segment LED readout to display the mode in which the system is operating.

The pilot may then switch the mode switch to the second automatic program switch. At the end of the number of segments of time corresponding to the setting of the second automatic program switch, the alarm is signalled again to notify the pilot to switch the fuel selector valve once more and advance the mode switch to the third mode. The pilot may continue the advancement of the mode switch for any predetermined number of modes until the end of the mode corresponding to the setting of the final mode switch. At the end of the final mode, the seven-segment LED mode readout displays the letter F and the alarm sounds at intermittent intervals to notify the pilot to land the plane.

The system thereby provides a signal to the pilot to permit him to manually operate a fuel selector valve at the proper period of time to thereby make optimum use of the supply of fuel without draining any of the tanks before the fuel selector valve is set to draw fuel from one of the other tanks. The preprogramming of the automatic program switches assures the pilot of proper fuel management of the fuel available for flying and the reserve fuel very accurately.

In the preferred embodiment, an oscillator provides a signal to a frequency divider which is formed from a suitable plurality of counters coupled in series. The frequency divider generates a pulse at the end of each time segment which, in the preferred embodiment is 15 minutes. The output of the frequency divider is fed to automatic/manual counting means in the form of an automatic/manual circuit which is normally set in the automatic mode to transmit a pulse to a decade counter. The automatic/manual count circuit also has a manual switch which permits manual incrementing of the decade counter.

The decade counter provides a binary output transmitted to a binary coded decimal to decimal decoder. The decade counter also transmits the binary coded output to a seven-segment LED (light emitting diode) driver. The output of the decade counter determines the segment of time in which the system is operating. The segment may be read out on a LED (light emitting diode) fuel segment readout.

The decoder decodes the input binary numbers to decimal numbers which are transmitted from associated output stages, each of which is coupled to an associated terminal of one of the automatic program switches.

As indicated above, at the end of the number of time segments determined by the first automatic program switch, an alarm is sounded to audibly notify the pilot to switch the selector valve. The pilot may then switch the mode switch to the next automatic program switch.

The mode switch has a second pole coupled to a reset circuit which resets the frequency divider and decade counter when the mode switch is switched from one mode to the next. The switching of the mode switch thereby begins the timing of the time segments which proceeds for a number of time segments corresponding to the setting of the second automatic program switch.

The mode switch is also connected to a seven-segment LED driver which drives a seven-segment LED mode readout. This provides a display of the mode in which the system is operating.

The final mode switch has outputs coupled through final mode circuitry to the mode LED driver, the segment LED driver and the alarm. The final mode switch may be set to one of a predetermined intermediary automatic program switch or the last automatic program switch. At the end of the mode corresponding to the setting of the final mode switch, the final mode switch activates the final mode circuitry to enable the mode LED and the segment LED to display the letter F to the pilot indicating that the final mode has expired and the plane is travelling on reserve fuel. The alarm is then sounded at intermittent intervals to further warn the pilot that he is travelling on reserve fuel and must land the aircraft shortly.

Accordingly, it is an object of the present invention to provide means for proper fuel management of an aircraft. Another object is to provide means for timing a plurality of predetermined time segments each corresponding to the usage of a fuel tank for a corresponding predetermined period of time.

A further object is to provide means for varying the mode of the timing of time segments.

Still another object of the present invention is to provide means for displaying the segments of time and the mode in which a vehicle with fuel management is operating.

Yet a further object of the present invention is to provide means for providing an alarm at the end of a predetermined time period of usage of a fuel tank.

Still a further object of the present invention is to provide means for either automatically or manually incrementing the time segments of an automatic program switch operable to provide a signal at the end of a predetermined number of time segments.

Still a further object is to provide means for enabling a fuel management computer to go into a final mode function at the end of an intermediary mode or at the end of the last mode.

These and other objects, advantages and novel features of the present invention will become apparent from the following detailed description of the invention when considered in conjunction with the accompaning drawings.

BRIEF DESCRIPTION OF THE DRAWINGS

FIGS. 2a through 2d taken together are a composite schematic diagram of the present invention.

DESCRIPTION OF THE PREFERRED EMBODIMENT

Figure 1:
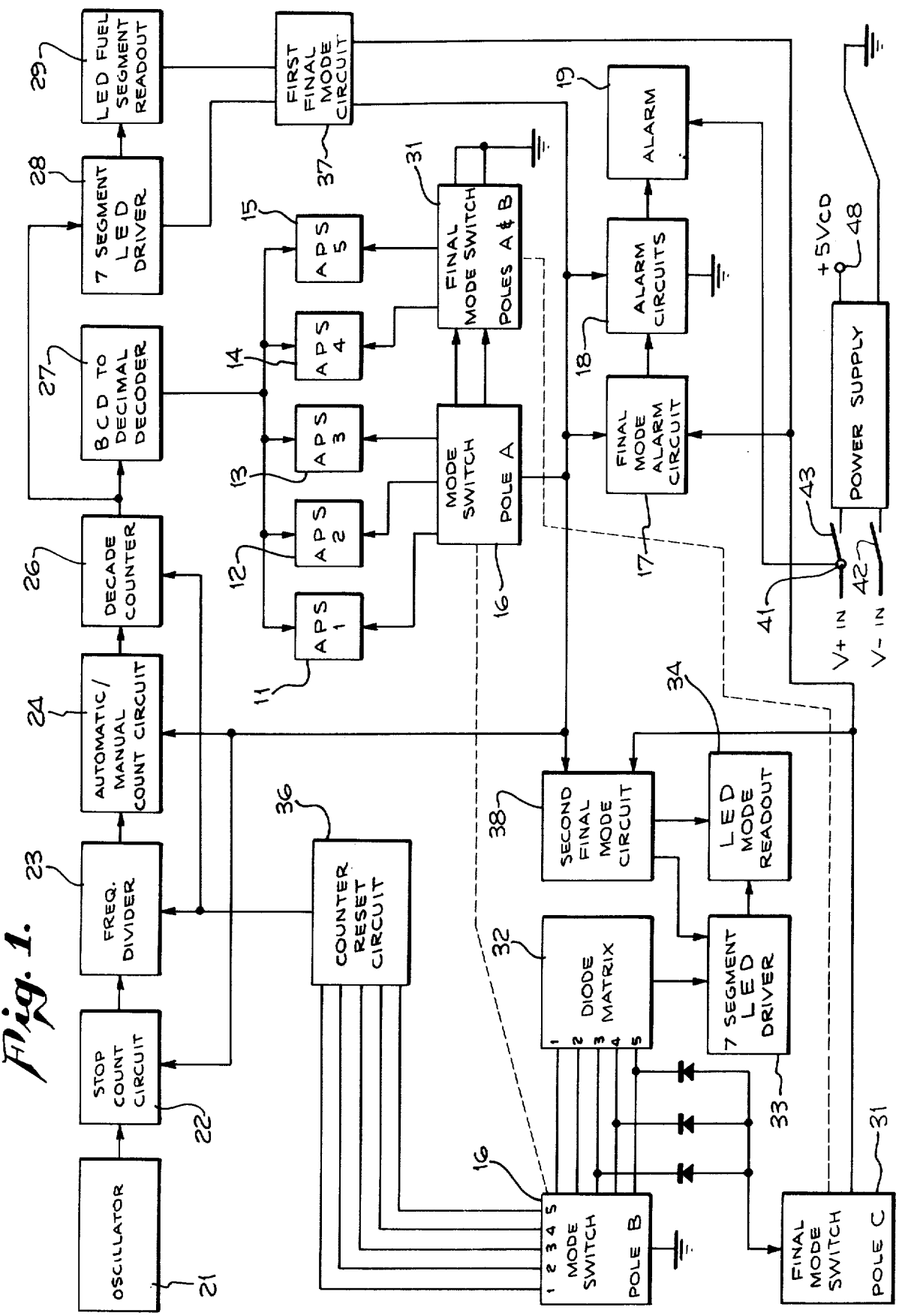
FIG. 1 is a block diagram of the present invention.

Referring now to FIG. 1, there is a plurality of automatic programming means in the form of automatic program switches 11 through 15 each coupled to mode control means in the form of mode switch 16. The pole A of mode switch 16 is connected to the final mode alarm circuit 17 as well as the alarm circuit 18 which operates alarm 19.

The automatic program switches may be each preset to a setting corresponding to the desired number of time segments of the corresponding one of the modes of operation of the vehicle. At the end of each mode, the pole A of mode switch 16 activates the alarm circuits 18 to activate alarm 19. The activation of alarm 19 notifies the pilot to switch the fuel selector valve to start using a different fuel tank during he next mode and switch the mode switch 16 to the next mode to begin the timing of the usage of the next fuel tank for a number of segments of time determined by the setting of the automatic program switch 12. As will be explained more fully hereinafter, the mode switch may be subsequently switched to the next succeeding automatic program switch to provide modes of timing in accordance with the setting of the next succeeding automatic program switch.

Signal means is provided for generating signals at predetermined time intervals. The signal means includes an oscillator 21, a stop count circuit 22, a frequency divider 23, an automatic/manual count circuit 24, and a decade counter 26, and a BCD (binary coded decimal) to decimal decoder 27.

More particularly, the signal means includes an oscillator 21 for generating pulses of a predetermined frequency. The pulses are fed through a stop count circuit 22 to a frequency divider 23. The frequency divider divides the frequency of the pulses generated by the oscillator 21 to provide an output signal at the end of a predetermined time segment. In the preferred embodiment, the oscillator has a frequency of one megahertz and the frequency divider has 8 decade counters and 2 three-stage counters, each connected in series to thereby divide the frequency by 900,000,000. The frequency divider thereby generates an output pulse once every 15 minutes.

The output of the frequency divider 23 is fed to an automatic/manual count circuit 24 which is normally set to transmit the pulses automatically to a decade counter 26. As will be explained more fully hereinafter, the automatic/manual count circuit is operable to manually transmit a pulse to the decade counter 26.

The decade counter 26 generates a binary output which corresponds to the time segment in which the computer is operating. This binary output is fed to BCD to decimal decoder 27 which has eight output terminals each corresponding to a time segment.

The decoder 27 converts the BCD input from the decade counter to a decimal output. The decimal output is transmitted along one of the eight output lines to a terminal of one of the eight input terminals of the automatic program switches 11 through 15.

Thus, the decoder 27 provides a logic level on one of its output stages corresponding to the time segment in which the system is operating. For example, if the system is in the first time segment, an output is generated by decoder 27 on output line 1 at the end of the 15 minute first time segment. Correspondingly, an output is generated on output No. 2 of decoder 27 at the end of the 15 minute second time segment. Thus, the automatic program switches may each be set to one of the eight terminals each corresponding to a subsequent time segment.

The decade counter 26 is also coupled to time segment display means for providing a real time display of the time segment in which the system is operating. In the preferred embodiment, this is shown as a seven-segment LED driver 28 operative to provide a binary coded signal. The LED driver 28 is coupled to a LED fuel segment readout 29 which provides a display of the time segment in which the system is operating.

The automatic program switches 11 through 13 are each coupled to pole A of mode switch 16. The automatic program switches 14 and 15 are coupled through poles A and B of a final mode switch 31 to pole A of mode switch 16.

Pole B of mode switch 16, which is ganged to pole A, is coupled through a diode matrix 32 to mode display means for providing a display of the mode in which the computer is operating. In the preferred embodiment, this is shown as a diode matrix 32 and a seven-segment LED driver 33 which drives a LED mode readout 34 to provide a visual display of the mode in which the system is operating.

In the operation of the system, pole A of mode switch 16 is initially set to the first automatic program switch 11. At the end of the number of time segments corresponding to the setting of the switch 11, a logic level is transmitted on the output line of the decoder 27 corresponding to the number of elapsed time segments. This logic level is transmitted through the pole A of mode switch 16 to activate the alarm 19 as indicated above. It is also transmitted to the stop count circuit 22 and the automatic/manual count circuit 24 to inhibit the transmission of pulses by these two circuits.

The pilot is thereby notified by the audible alarm generated by alarm 19 to switch the fuel selector valve to begin drawing fuel from another fuel tank. The pilot is also notified to switch the mode switch to the second automatic program switch 12 to begin the timing of the usage of the next fuel tank for a number of time segments corresponding to the setting of automatic program switch 12.

Pole B of mode switch 16, which is ganged with pole A is coupled to a counter reset circuit 36 to provide a resetting signal to the frequency divider 23 and the decade counter 26. The switching of pole A of mode switch 16 also changes the logic level to the stop count circuit 22 and the automatic/manual count circuit 24 to enable them to transmit pulses once again to begin the generation of pulses and logic levels.

Final mode means provide a final mode signal at the end of the last mode. This signal notifies the pilot that the aircraft is travelling on reserve fuel.

In the preferred embodiment this is shown as the final mode switch 31 having poles A and B each connected to automatic program switches 14 and 15 respectively and pole C connected to a first final mode circuit 37 and a second final mode circuit 38. The final mode switch provides flexibility in changing the final mode, to thereby permit the system to be used in a two-tank aircraft in three modes of operation or a four-tank aircraft in five modes of operation. Exemplary modes of timing of usage of the fuel tanks has been shown above.

Thus, when the final mode switch is set to accommodate a three mode program to provide a timing program for an aircraft having two tanks, final mode switch 31 and pole A of mode switch 16 transmit logic levels to the second final mode circuit 38. The circuit 38 inhibits the operation of the LED driver 33 and activates LED mode readout 34 to display a letter F to indicate that the final mode has expired.

Similarly, final mode switch 31 and pole A of mode switch 16 are connected to the first final mode circuit 37 which inhibits the seven-segment LED driver 28 and simultaneously activates the LED fuel segment readout 29 to display the letter F. The pilot is thereby notified of the fact that the final mode has expired and the aircraft is travelling on reserve fuel and should be landed immediately. A final mode alarm circuit 17 is connected to the final mode switch and pole A of mode switch 16 to activate alarm circuit 18 to intermittently sound an alarm 19 to further notify the pilot that the aircraft is travelling on reserve fuel and must be landed.

Incoming power to the computer system is supplied by the electrical system of the airplane. The incoming voltage is nominally 14 volts dc. However, the computer will operate with an incoming voltage of 8 to 16 volts dc. The incoming power supply is transmitted through switch 41 which is a double pole, double throw switch as shown in FIG. 2d having contacts 42 and 43.

The incoming voltage is fed to a power supply comprised of a power transistor 44, a bias resistor 46, and a monolithic three-terminal voltage regulator 47. The voltage regulator 47 provides a constant 5-volt dc regardless of change in the input voltage. This five-volt dc is the $V_{cc}$ for the circuit and appears as terminal 48. Capacitor 49 provides bypassing and capacitor 51 provides filtering. Transistor 44 is used as a by-pass element so as to draw a substantial amount of current of the circuit. The total current draw for the circuit in the preferred embodiment is approximately 700 milliamps. The voltage regulator handles approximately 240 milliamps, and the transistor 44 handles approximately 460 milliamps. The voltage input is also applied to the audio alarm 19 to supply positive power thereto.

Figure 2A:
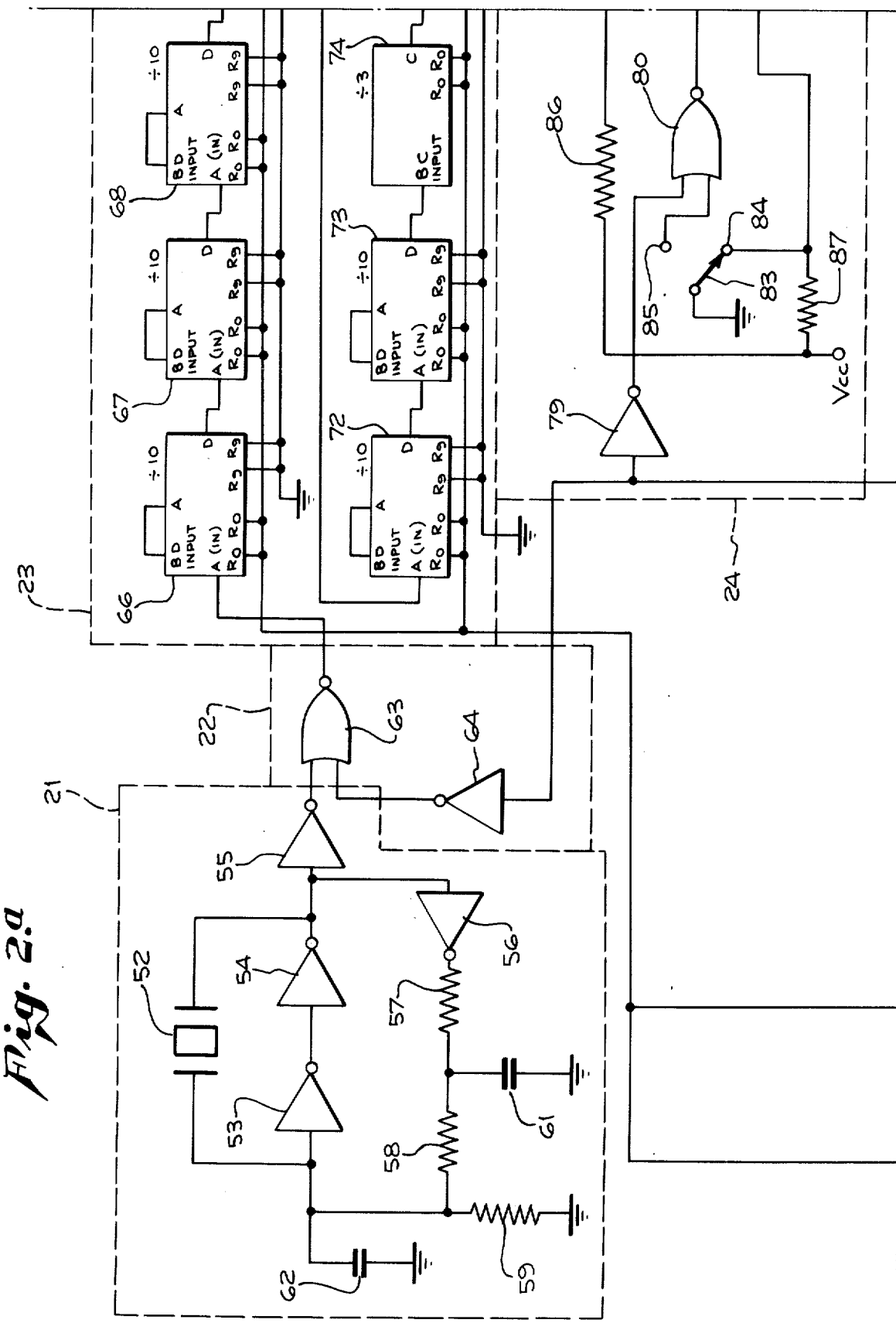

Oscillator means is shown in the form of oscillator 21 in schematic diagram form in FIG. 2a. The oscillator 21 is shown having a crystal 52 and inverters 53, 54, 55 and 56. A voltage divider network is provided by bias resistors 57, 58 and 59. Capacitor 61 is a bypass capacitor and capacitor 62 insures self-starting of the oscillator.

The oscillator is fed to the input of the stop count circuit 22 having a NOR gate 63 and an inverter 64. The stop count circuit 22 is operative in response to a logic level from the mode switch 16 to discontinue the transmission of the pulses from the oscillator 21 when the number of time segments corresponding to the setting of the automatic program switch to which the mode switch is set has expired.

In the preferred embodiment, ordinarily the mode switch 16 shown in FIG. 2d transmits a logic 1 level from the decoder 27 when it is set to an automatic program switch before the expiration of the time segments corresponding to the setting of the switch. When the time segments expire, a logic 0 level is transmitted from the associated output of the decoder through an automatic program switch via mode switch 16 to inverter 64 which provides a logic 1 output level to disenable NOR gate 63. Of course, the oscillator 21 continues oscillating regardless of whether the pulses are transmitted through stop count circuit 22.

The output of the stop count circuit 22 is fed to frequency dividing means in the form of a frequency divider 23 having 8 decade counters 66 through 73 and 2 divide by 3 counters 74 and 76 as shown in FIGS. 2a and 2b. The 8 decade counters and the 2 divided by 3 counters divide the frequency of the 1 megahertz signal of the oscillator by 900,000,000. This division provides an output from the frequency divider of one signal every 15 minutes.

The output of the frequency divider 23 is transmitted by inverter 77 to means for providing signals at predetermined time intervals either automatically or manually. In the preferred embodiment, this is shown as automatic/manual count circuit 24. The automatic/manual count circuit 24 includes in addition to NAND gate 78, inverter 79, NOR gate 80, inverter 81 and NAND gate 82. In addition, switch 83 permits the system to be operated in the automatic mode to generate an output logic level at the end of each 15 minute time segment to thereby automatically increment the time segment when switch 83 is in the normally closed position to be in contact with terminal 84. However, the circuit has sufficient flexibility to permit manual incrementing of the time segment by switching the switch 83 to make contact with the normally open terminal 85. The circuit also includes threshold setting resistors 86 and 87. The truth tables for NAND gates and NOR gates are well known in the art.

The first input to NAND gate 78 comes from the 8th and last output of the decoder 27. The decoder has eight outputs to accommodate the eight terminals of the automatic program switches. The purpose of the first input to NAND gate 78 is to inhibit it when manually programming the computer to prevent the operator from advancing the time segment count past 8.

The second input to NAND gate 78 receives the output pulse from inverter 77 to advance the count of the decade counter 26 at the end of each time segment.

The third input to NAND gate 78 is the output of inverter 81 and threshold setting resistor 86. When it is desired to manually advance the time segment count of the computer, switch 83 is depressed and released to make contact with terminal 85 while opening the normally closed connection to terminal 84. This causes a logic 0 to be applied to the input to NOR gate 80 and causes its output to go to a logic one level (unless it receives another input from the mode switch 16 transmitted through inverter 79). The output of inverter 81 thereby changes its logic level to a logic 0 which is applied to the third input of NAND gate 78 to thereby cause the NAND gate to change its output from a logic 0 to a logic 1 to advance the count in the decade counter 26.

The NOR gate 80 disallows manual programming after the expiration of a number of time segments corresponding to the setting of the switch to which mode switch 16 is connected. After this expiration of time segments of a mode, the output of the mode switch provides a logic 0 level which is inverted by inverter 79 to a logic 1 level. This is connected to the other input of NOR gate 80 to inhibit it and thereby inhibit the manual program switch 83.

The fourth input of NAND gate 78 is coupled from the output of NAND gate 82. One input to NAND gate 82 is connected to the terminal 84 of the manual program switch which has its wiper grounded to thereby provide a logic 0 level to it. The other input to NAND gate 82 is coupled from the output of NAND gate 78.

The second input of the NAND gate 82 is connected from the output of NAND gate 78 so as to provide a logic 0 input to NAND gate 82 when NAND gate 78 has 1 applied to all of its inputs. Thus, NAND gates 78 and 82 provide a no-bounce circuit which allows automatic and manual programming.

The output of NAND gate 78 of the automatic/manual count circuit is coupled to the input of decade counter 26 to advance the counter 1 count at the end of each time segment. The decade counter 26 provides a binary coded output with terminals A, B, C, and D representing binary digits. The output of the driver 28 is coupled to the LED fuel segment readout 29 to provide a display of the current time segment in which the system is operating.

The output of the counter 26 is also fed to the BCD to decimal decoder 27 which decodes the binary coded input to provide a decimal output on the associated decimal output terminals 1 through 8. Each of the eight outputs of the decoder 27 is connected in parallel to the associated terminal of the automatic program switches 11 through 14.

Thus, the decoder 27 provides an output logic level on one of the 8 outputs corresponding to the time segment in which the system is operating. When the output of the decoder 27 advances to the segment corresponding to the setting of the automatic program switch to which mode switch 16 is set, the logic level will be transmitted through the mode switch 16 to activate the stop count circuit 22 to inhibit transmission of pulses. The output level will also be transmitted from the mode switch 16 to the automatic/manual count circuit 24 to inhibit the transmission of pulses.

In the preferred embodiment, the eight outputs of the BCD to decimal decoder 27 are all at logic 1 level initially. At the expiration of the first time segment, which is 15 minutes in duration, the output No. 1 goes to a logic 0 level while all the other outputs remain at logic 1. At the expiration of the second time segment, the output of the second stage of the decoder 27 goes to logic 0 level and the output of the first stage reverts to a logic 1 level. Thus, the output of each stage switches from the logic 1 level to the logic 0 level at the end of the time segment corresponding to the output stage of the decoder 27.

For example, if the mode switch 16 were set to the first automatic program switch 11 and the automatic program switch 11 were set to the third position, at the end of three time segments (each 15 minutes long), output NO. 3 of the decoder 27 would go from a logic 1 to a logic 0 level. The wiper of pole A of mode switch 16 would transmit a logic 0 level to inverter 79 which would transmit a logic 1 level to NOR gate 80. This would inhibit manual programming switch 83 from functioning to thereby prevent the automatic/manual count circuit 24 from transmitting pulses. Simultaneously, NOR gate 63 would be turned off through inverter 64 to prevent pulses from the oscillator 21 from being transmitted to the frequency divider 23.

At the end of the 3 time segments in the above example, the mode switch 16 would also activate the alarm circuit 18 via diode 90. When a logic 1 level is transmitted from the decoder 27 to pole A of mode switch 16 to diode 90, a transistor 91 is turned on to supply ground to a monolithic timing chip 92. The conductivity of transistor 91 is operative to cause the output No. 3 of the timing chip to be at a logic 0 level. This output is connected to the base input of a transistor 93 through a resistor 94.

Prior to the expiration of the time segments corresponding to the automatic program switch to which the mode switch is set, the transistor 93 has a 0 applied to its base terminal from the monolithic timing chip 92 to thereby turn it off. When the output of pole A of mode switch 16 transmits a logic 0 level through diode 90 to the base of transistor 91, the transistor is turned off to thereby remove a ground potential to the ground input No. 1 of the timing chip 92. This has the effect of switching the logic level of output No. 3 of the timing chip 92 to a logic 1 which is applied to the base of transistor 93 to turn it on. The conductivity of transistor 93 provides a completed circuit for the alarm 19 to cause it to be sounded until pole A of mode switch 16 is turned to the next automatic program switch. The capacitor 95 provides filtering and the capacitor 91 and the resistor 97 provide a timing network for the timing chip.

Figure 2C:
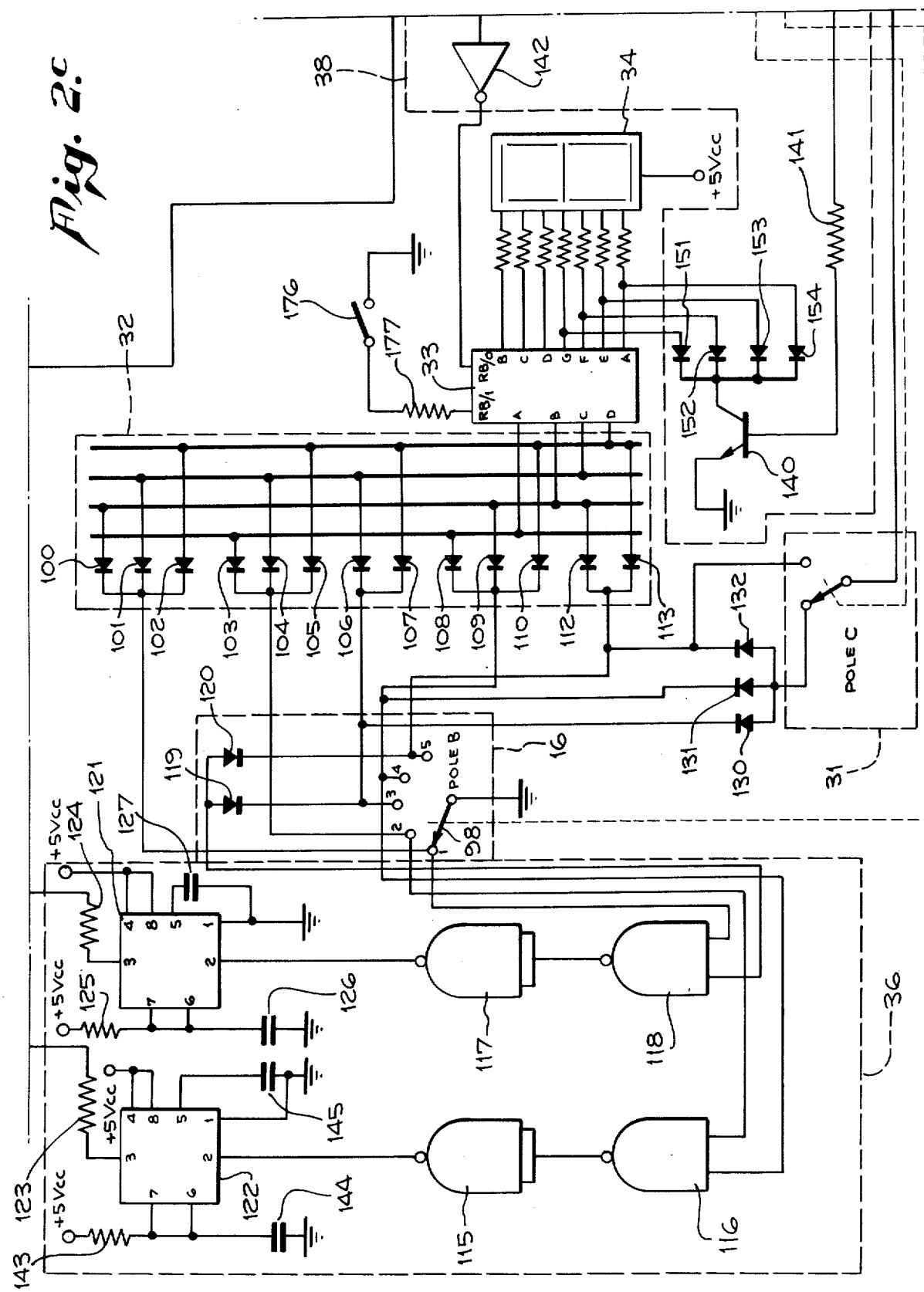
Figure 2D:
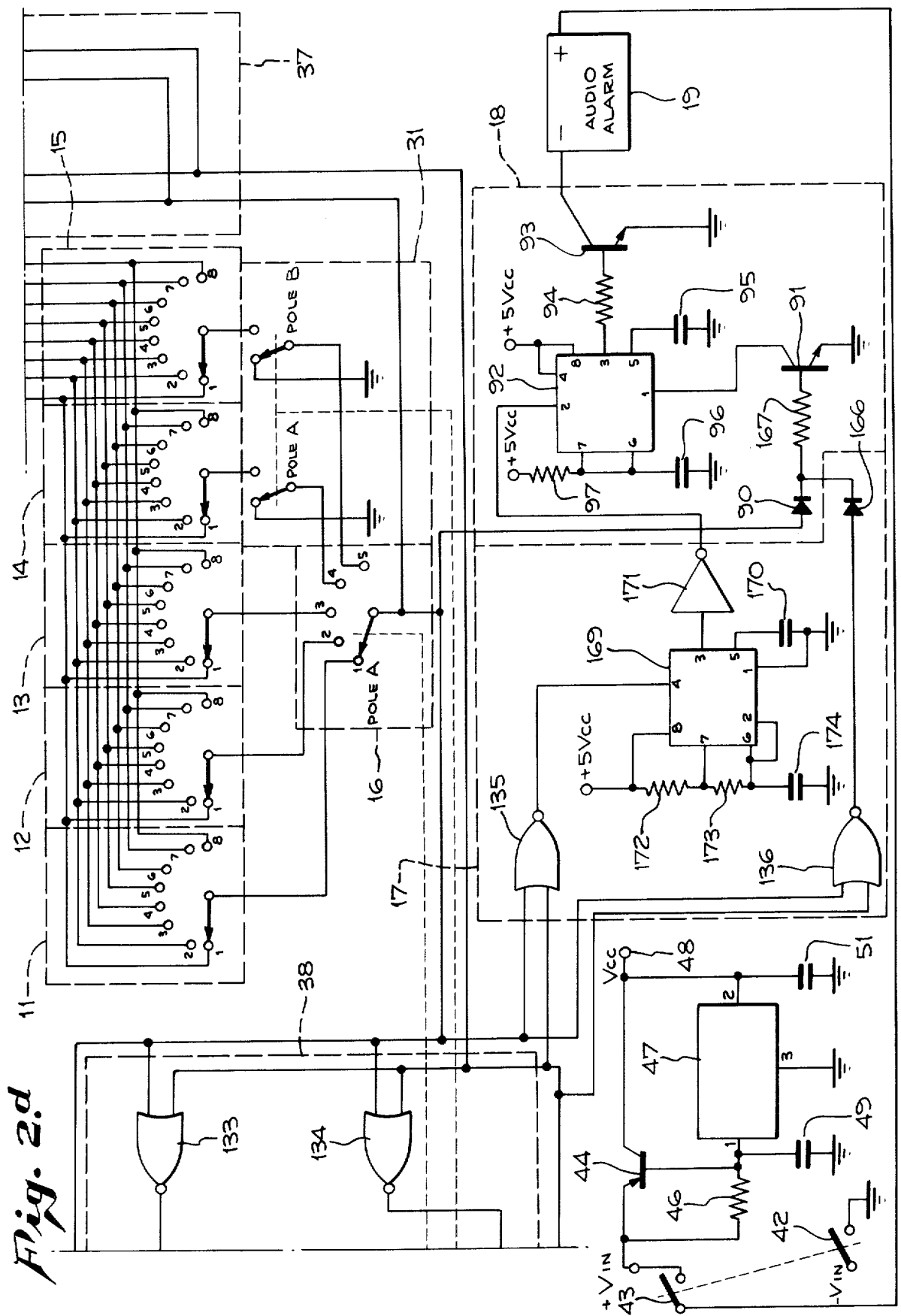

Pole B of mode switch 16 shown in FIG. 2c, provides two functions. One is to provide a logic level through diode matrix 32 to the LED mode readout to display the proper mode 1 through 5 or 1 through 3, depending upon the setting of the final mode switch 31. The second function of pole B is to activate counter reset circuit means in the form of a counter reset circuit 36 when pole A is switched from one automatic program switch to the next automatic program switch.

In the operation of pole B of mode switch 16, the wiper 98 is grounded as shown. When the mode switch is in the No. 1 position, it provides a logic 0 level through diodes 100, 101 and 102 to the B C and D inputs of LED drive 33. This provides a display of a numeral 1 on the LED mode readout 34. The remaining diodes 103 through 113 comprise the remainder of the diode matrix 32 and are operative to generate the binary coded digits to provide the display of the remaining numbers 2 through 5 which are decoded by the LED driver 33 to be displayed on the LED mode readout 34 and the mode switch is switched to successive modes.

The second function of pole B of mode switch 16 is to provide an output to the counter reset circuit 36 which is obtained through NAND gates 115 through 118 of the counter reset circuit 36. NAND gate 118 has one input connected to the No. 1 contact of pole B of mode switch 16 and a second input connected through diodes 119 and 120 to terminals 3 and 5 respectively. NAND gate 116 has its first input connected to the second contact of pole B of mode switch 16 and its second input connected to the No. 4 contact of pole B of mode switch 16.

NAND gate 115 has both of its inputs connected to the output of NAND gate 116. NAND gate 117 has both of its inputs connected to the output of NAND gate 118. The output of NAND gate 117 is connected to a trigger input, input No. 2, of a timing chip 121 as shown. The output of NAND gate 115 is connected to the trigger input, input No. 2 of a timing chip 122. Each of the timing chips is set to provide an output pulse of a 100 millisecond duration on terminal 3 when the input signal to terminal 2 of the timing chip is a logic 0.

Resistor 125 and capacitor 126 form the timing networks for timing chip 121 and the capacitor 127 provides filtering. Resistor 143 and capacitor 144 form the timing network for the timing chip 122 and capacitor 145 provides filtering.

The reason that NAND gates 115 and 116 are series connected and NAND gates 117 and 118 are series connected is to allow the input of the gates connected to the pole B of mode switch 16 to be at the same logic level as the outputs of the gates connected to the timing chips. This insures proper sequencing of the reset function.

The output of the timing chips 121 and 122 from terminal 3 are parallel connected through resistors 123 and 124 respectively to the reset inputs of the decade counters 66 through 73 and the divide-by-three counters 74 and 76.

When pole B of mode switch 16 is set to the No. 1 position, the first input to NAND gate 118 is at a logic 0 and the output is at a logic 1. This logic 1 is applied to both inputs of NAND gate 117 to provide the generation of a logic 0 on its output. This in turn triggers the timing chip 121 to provide an output loic 1 for a period of time determined by the timing chip. In the preferred embodiment, the timing chip is set to provide a logic level 1 for a period of 100 milliseconds after which the output terminal 3 returns to a logic 0 level. This resets the counters 66 through 76 to enable the computer to begin the counting function once more.

In the preferred embodiment, the counters are reset at a logic 1 level and provide a counting at a logic 0 level on their reset inputs $R_o$. The timing chips 121 and 122 are thereby connected for one-shot operation. That is, after one of the timing chips provides its output pulse, the input trigger terminal No. 2 must go to a logic 1 level before the timing chips can be retriggered. It is apparent from the fact that NAND gates 116 and 118 are connected to alternate contacts of pole B of mode switch 16 that the input 2 of the timing chips 122 and 123 will have opposite input levels. This permits the computer to be reset when the mode switch 16 is turned from one mode to the next succeeding mode.

The final mode switch 31 initiates a final mode signal indicating that the last mode has expired. The final mode switch 31 has flexibility to initiate the final mode signal either at the end of the timing segments corresponding to a predetermined intermediary automatic program switch or at the end of the timing segments of all of the automatic program switches. In the preferred embodiment, the final mode switch is shown operative to initiate the final mode signal at the end of the time segments of the third automatic program switch or alternatively at the end of the time segments of the fifth automatic program switch. The setting of the final mode switch on the third automatic program switch provides for three modes of timing to accommodate an aircraft having two tanks. An exemplary timing sequence for three modes has been shown above in the description of the background of the invention. The setting of the final mode switch to initiate the final mode signal at the end of the fifth automatic program switch is operative to accommodate an aircraft having four tanks with five timing modes. An exemplary timing sequence for such a five mode operation was described above in the description of the preferred embodiment of the present invention.

In FIGS. 2c and 2d, poles A, B and C of the final mode switch are shown set to the two-tank position. Poles A and B of automatic program switches 14 and 15 are grounded so that if pole A of mode switch 16 is inadvertently turned to automatic program switches 14 or 15, their outputs are inhibited. Pole C of the final mode switch is connected to contacts 3, 4 and 5 of pole B of mode switch 16 through diodes 130, 131 and 132 respectively. This prevents the numerals 4 or 5 from being displayed on the LED mode readout 34. When the final mode switch is set to the two-tank position, the LED mode readout 34 will display the letter F when the mode switch is turned to the 4 or 5 position.

When the final mode switch is set to the two-tank position throughout the first mode, the LED mode readout 34 displays the number 1 indicating that the system is operating in the first mode. Throughout the first mode, the LED fuel segment readout 29 provides a display of the time segment in which the system is operating. At the end of the first mode, the logic level on the wiper of pole A of mode switch 16 changes from logic 1 to logic 0. This turns off NOR gate 63 through inverter 64 and the computer stops counting. The automatic/manual count circuit 24 is inhibited by a logic level transmitted by inverter 79 to NOR gate 80. The LED fuel segment readout 29 has been advanced during the first mode to provide a display of the number of time segments that the automatic program switch has been preprogrammed for in that mode. The LED mode readout 34 continues to display a numeral 1 and the alarm circuit 18 activates the alarm 19 to notify the pilot to switch the fuel selector valve to begin using a different fuel tank. The alarm remains activated until the pilot turns pole A of mode switch 16 to contact automatic program switch 12. The switching of pole A of mode switch 16 to a subsequent mode enables stop count circuit 22 and automatic/manual count circuit 24.

When pole B of the mode switch 16 is switched from the first mode to the second mode, the reset circuit 36 through the associated NAND gates 115, 116, 117 and 118 and the timing chips 121 and 122 reset the counters of the frequency divider 23 and the decade counter 26. This has the effect of resetting LED fuel segment readout 29 to display a zero. The audio alarm 19 is turned off and the computer begins counting for the second mode until the expiration of the number of time segments corresponding to the setting of the second automatic program switch 12. During ths period of time the LED mode readout switch 34 displays the number 2.

At the end of the second mode, the stop count circuit 22 and the automatic/manual count circuit 24 again inhibits the transmission of pulses. The alarm 19 is again activated to notify the pilot to switch the fuel selector valve to begin using a different fuel tank. The alarm remains activated until the pilot turns pole A of mode switch 16 again to contact automatic program switch 13. This enables stop count circuit 22 and automatic/manual count circuit 24 again. The switching of pole B of the mode switch 16 to the next mode activates counter reset circuit 36 to reset the frequency divider 23 and decade counter 26 to reset the LED fuel segment readout 29 to begin the counting of time segments again until the end of the period of time corresponding to the number of time segments to which automatic program switch 13 is set. The above-described procedure is again followed and the third mode is begun.

When the final mode switch 31 is in the two-tank position, at the end of the number of time segments corresponding to the setting of the third automatic program switch 13, the wiper of pole C of final mode switch 31 provides a logic 0 level to the NOR gates 133 and 134 of the second final mode circuit 38 and the NOR gates 135 and 136 of the final mode alarm circuit 17. The logic level from pole C of the final mode switch 31 is also applied to the input of NOR gates 137 and 138 of the first final mode circuit 37. The other input to the NOR gates 133 through 138 is connected to pole A of the mode switch 16 to thereby provide a logic 0 input level to all of these NOR gates to generate a logic 1 output from the gates 133 through 138.

The logic 1 level from NOR gate 133 is transmitted through an inverter 142 to inhibit the 7-segment LED driver 33 to thereby prevent it from controlling the LED mode readout 34. This permits the control of the LED mode readout by the second final mode circuit 38. NOR gate 134 is thereby enabled to activate a transistor 140 through a current limiting resistor 141 to ground diodes 151 through 154 to permit the LED mode readout 34 to display the letter F to thereby indicate that the final mode has expired.

The logic 0 levels from the pole A of the mode switch 16 and from pole C of the final mode switch 31 are also applied to NOR gates 137 and 138 of the first final mode circuit 37 to inhibit the 7-segment LED driver 28 through an inverter 155 to thereby prevent it from controlling the LED fuel segment readout 29.

NOR gate 137 is coupled through a current limiting resistor 156 to the base of a transistor 157 to thereby connect the diodes 161 through 164 to ground to thereby display the letter F on the fuel segment readout 29 to further notify the pilot that the final mode has expired.

The logic 1 output of NOR gate 136 of the final mode alarm circuit 17 is transmitted through diode 166 via a current limiting resistor 167 to the base of transistor 91 to turn it on. This applies a ground potential to the ground input No. 1 of the timing chip 92. The logic 1 output level of NOR gate 135 is coupled to the reset input of a timing chip 169 which is connected in an astable function to automatically trigger itself to free run as a multivibrator. The resistors 172 and 173 and capacitor 174 form the timing network for the timing chip 169. The output No. 3 of the timing chip 169 will thereby change from the logic 0 to the logic 1 level in an oscillatory manner until it is inhibited by a logic 0 from NOR gate 135 to the reset terminal No. 4.

NOR gate 135 is normally set to generate a logic 0 output. When a logic 0 input is applied to one terminal from pole A of mode switch 16, and a logic 0 input is applied from pole c of final mode switch 31 at the end of the final mode, NOR gate 135 is activated to generate a logic 1 output to timing chip 169. This logic 1 is applied to reset terminal No. 4 of the timing chip 169 to activate the timing chip to generate a logic one output for a predetermined time interval.

The logic 1 output from timing chip 169 is inverted by an inverter 171 and applied to input 2 of the timing chip 92 to change its output from a logic 0 to a logic 1 for 5 seconds. During this 5 second interval, transistor 93 connects the audio alarm 19 to ground to activate it to generate the audio alarm for the 5 second interval. At the end of the 5 second interval, the output of timing chip 92 goes to a logic 0 level and transistor 93 is turned off to thereby silence the audio alarm 19.

The timing chip 169 is set to provide a logic 1 output after a 3 minute interval. The logic 1 output is again inverted by inverter 171 to provide a logic 0 input to timing chip 92. The timing chip 169 thereby provides 3 minute intervals between the 5 second audio alarm ater the end of the final mode. As indicated above, The LED readouts 29 and 34 display the letter F under these circumstances indicating to the pilot that the aircraft if flying on reserve fuel. The entire computer has terminated the counting process and the automatic/manual count circuit 24 is inhibited.

When the final mode switch is set to the four-tank position, poles A and B are connected to the automatic programming switches 14 and 15 to permit them to operate in the normal manner. At the end of the time segments of the fifth mode, the final mode switch is operative to activate the first final mode circuit 37 and the second final mode circuit 38 to activate the LED fuel segment readout 29 and the LED mode readout 34 respectively to display the letter F in the same manner as described above in conjunction with the two-tank setting of the final mode switch.

Similarly, the final mode alarm circuit 17 is activated to enable the alarm circuit 18 to energize the alarm 19 to provide an audible signal that the final mode has expired. Thus, the audio alarm is operative to provide a 5-second audible alarm every 3 minutes to notify the pilot that the plane is flying on reserve fuel.

A switch 176 and resistor 177 are provided to control the LED driver 33 to provide dimming of the display of the LED readout 34. Similarly, a switch 178 and a resistor 179 control the LED drivers 28 to provide dimming of the LED readout 29.

The preferred embodiment is preferably constructed of integrated circuits which may be of the TTL digital logic type or CMOS. Although not shown schematically in all instances, all the active circuits are connected to the $V_{cc}$ and ground terminals to provide proper power and grounding in a manner well known in the art.

Obviously, many modifications and variations of the present invention are possible in the light of the above teachings. For example, the system may be constructed to control the fuel selector valve directly to automatically select a different fuel tank at the end of each mode. In such an embodiment, the mode switch may be coupled to a suitable mechanical or electrical means to change modes automatically at the expiration of the time segments corresponding to the automatic program switch to which the mode switch is connected. Furthermore, although the system is particularly useful to provide fuel management for an aircraft, it may be adapted to provide fuel management for any vehicle or timing for any other suitable application.

Another modification is the coupling of the stop count circuit 22 between the frequency divider 23 and the automatic/manual count circuit 24. It is therefore to be understood within the scope of the appended claims, the invention may be practiced otherwise than as specifically described.

I claim:

1. A fuel management computer for providing timing for usage of fuel tanks of an aircraft comprising:
   signal means for generating signals at predetermined time segments,
   a plurality of automatic program means, each operatively coupled to said signal means and each corresponding to a specific mode of usage of said fuel tanks,
   mode control means coupled to said plurality of automatic program means for selecting one of said plurality of automatic program means in sequence for timing the usage of one of the fuel tanks of the aircraft, said mode control means being operatively coupled to said signal means to inhibit the provision of signals at the end of each mode of usage of said fuel tanks,
- time segment display means operatively coupled to said signal means for providing a real time display of the time segment in which the computer is operating,
- mode display means operatively coupled to said mode control means for providing a display of the mode in which the computer is operating, and
- alarm means operatively coupled to said mode control means for providing an alarm signal at the end of each mode of usage to thereby enable the operator to time the usage of the fuel tanks.

2. The computer as described in claim 1 and further comprising reset means coupled between said mode control means and said signal means for enabling said signal means at the beginning of the selection of one said modes of usage.

3. The computer as described in claim 1 and wherein each of said plurality of automatic program means comprises a manually settable switch having a plurality of positions each corresponding to a time segment with each said switch being settable to provide timing of different modes of usage of said fuel tanks.

4. A computer for providing timing for a plurality of modes comprising:
- signal means for generating signals at predetermined time segments,
- time segment display means operatively coupled to said signal means for providing a real time display of the time segment in which the computer is operating,
- a plurality of automatic program means each operatively coupled to said signal means and corresponding to a specific mode and each presettable to provide timing for a predetermined number of time segments,
- mode control means coupled to said plurality of automatic program means for selecting one of said plurality of automatic program means in sequence for providing timing in each mode for a period of time segments corresponding to the setting of the selected automatic program means,
- final mode means operatively coupled to said automatic program means and said mode control means and presettable to provide selectivity in varying the last mode of operation of said plurality of automatic program means to provide a final mode signal at the end of the present final mode, and
- a final mode circuit operatively coupled between said final mode switch and said time segment display means to enable said time segment display means to provide a display of said final mode signal at the expiration of the final mode.

5. The computer as described in claim 4 and wherein said signal means includes circuit means for controlling the provision of signals to said plurality of automatic program means either automatically or manually.

6. The computer as described in claim 5 and wherein said circuit means includes at least one NAND gate and a NOR gate normally set to provide such signals to said plurality of automatic program means automatically at the expiration of each time segment.

7. The computer as described in claim 6 and wherein said circuit means further includes manual switch means normally set to enable said circuit means to provide signals to said plurality of automatic program means automatically at the expiration of each time segment, said manual switch means being further settable to provide a signal manually.

8. The computer as described in claim 7 and wherein said NOR gate is operatively coupled to said mode control means to inhibit the provision of signals at the end of a mode and to enable said circuit at the beginning of the next mode.

9. The computer as described in claim 4 and wherein said final mode circuit includes,
- a first NOR gate coupled between said final mode switch and said time segment display means to inhibit the normal operation thereof, and
- a second NOR gate coupled between said final mode switch and said time segment display means to enable said time segment display means to provide a display of said final mode signal at the expiration of the final mode.

10. A fuel management computer for providing timing for usage of fuel tanks of an aircraft comprising:
- signal means for generating signals at predetermined time segments, said signal means including counting means,
- a plurality of automatic program means, each operatively coupled to said signal means and each corresponding to a specific mode of usage of said fuel tanks,
- mode control means coupled to said plurality of automatic program means for selecting one of said plurality of automatic program means in sequence for timing the usage of one of the fuel tanks of the aircraft,
- reset means coupled between said mode control means and said counting means for resetting said counting means at the beginning of each mode of operation,
- time segment display means operatively coupled to said signal means for providing a real time display of the time segment in which the computer is operating,
- mode display means operatively coupled to said mode control means for providing a display of the mode in which the computer is operating, and
- alarm means operatively coupled to said mode control means for providing an alarm signal at the end of each mode of usage to thereby enable the operator to time the usage of the fuel tanks.

11. A fuel management computer for providing timing for usage of fuel tanks of an aircraft comprising;
- signal means for generating signals at predetermined time segments, said signal means including circuit means for the provision of signals either automatically or manually,
- a plurality of automatic program means, each operatively coupled to said signal means and each corresponding to a specific mode of usage of said fuel tanks,
- mode control means coupled to said plurality of automatic program means for selecting one of said plurality of automatic program means in sequence for timing the usage of one of the fuel tanks of the aircraft,
- time segment display means operatively coupled to said signal means for providing a real time display of the time segment in which the computer is operating, mode display means operatively coupled to said mode control means for providing a display of the mode in which the computer is operating, and alarm means operatively coupled to said mode control means for providing an alarm signal at the end of each mode of usage to thereby enable the operator to time the usage of the fuel tanks.

12. A fuel management computer for providing timing for usage of fuel tanks of an aircraft comprising:

signal means for generating signals at predetermined time segments, said signal means including logic level means having a plurality of outputs, a plurality of automatic program means, each corresponding to a specific mode of usage of said fuel tanks and each having a plurality of positions with each position coupled to a different one of said plurality of outputs of said logic level means to vary the logic level to each succeeding position in accordance with the expiration of time segments for timing the usgae of one of the fuel tanks of the aircraft, mode control means coupled to said plurality of automatic program means for selecting one of said plurality of automatic program means in sequence for timing the usage of one of the fuel tanks of the aircraft, time segment display means operatively coupled to said signal means for providing a real time display of the time segment in which the computer is operating, mode display means operatively coupled to said mode control means for providing a display of the mode in which the computer is operating, and alarm means operatively coupled to said mode control means for providing an alarm signal at the end of each mode of usage to thereby enable the operator to time the usage of the fuel tanks.

13. A fuel management computer for providing timing for usage of fuel tanks of an aircraft comprising:

signal means for generating signals at predetermined time segments, a plurality of automatic program means, each operatively coupled to said signal means and each corresponding to a specific mode of usage of said fuel tanks, mode control means coupled to said plurality of automatic program means for selecting one of said plurality of automatic program means in sequence for timing the usage of one of the fuel tanks of the aircraft, time segment display means operatively coupled to said signal means, said time segment display means including a LED driver and a LED readout coupled to said LED driver for providing a real time display of the time segment in which the computer is operating, mode display means operatively coupled to said mode control means for providing a display of the mode in which the computer is operating, and alarm means operatively coupled to said mode control means for providing an alarm signal at the end of each mode of usage to thereby enable the operator to time the usage of the fuel tanks.

14. A fuel management computer for providing timing for usage of fuel tanks of an aircraft comprising:

signal means for generating signals at predetermined time segments, a plurality of automatic program means, each operatively coupled to said signal means and each corresponding to a specific mode of usage of said fuel tanks, mode control means coupled to said plurality of automatic program means for selecting one of said plurality of automatic program means in sequence for timing the usage of one of the fuel tanks of the aircraft, said mode control means including a switch having at least two poles with one pole adapted to be coupled to one of said plurality of automatic program switches, time segment display means operatively coupled to said signal means for providing a real time display of the time segment in which the computer is operating, mode display means operatively coupled to the second pole of said mode control means for providing a display of the mode in which the computer is operating, and alarm means operatively coupled to said mode control means for providing an alarm signal at the end of each mode of usage to thereby enable the operator to time the usage of the fuel tanks.

15. The computer as described in claim 14 and wherein said mode display means includes, a diode matrix coupled to said second pole for providing an encoded signal corresponding to the position of said mode control means, LED driver means coupled to the output of said diode matrix, and LED readout means coupled to said LED driver means for providing a display of the mode in which the computer is operating.

16. A fuel management computer for providing timing for usage of fuel tanks of an aircraft comprising:

signal means for generating signals at predetermined time segments, a plurality of automatic program means, each operatively coupled to said signal means and each corresponding to a specific mode of usage of said fuel tanks, mode control means coupled to said plurality of automatic program means for selecting one of said plurality of automatic program means in sequence for timing the usage of one of the fuel tanks of the aircraft, time segment display means operatively coupled to said signal means for providing a real time display of the time segment in which the computer is operating, mode display means operatively coupled to said mode control means for providing a display of the mode in which the computer is operating, alarm means operatively coupled to said mode control means for providing an alarm signal at the end of each mode of usage to thereby enable the operator to time the usage of the fuel tanks, and final mode means operatively coupled to said automatic program means and said mode control means and presettable to provide selectivity in varying the last mode of operation of the computer and to provide a final mode signal at the end of the preset final mode.

17. The computer as described in claim 15 and wherrein said final mode means includes a switch having first pole means operatively coupled to inhibit each automatic program switch corresponding to each mode subsequent to said selective mode.

18. The computer as described in claim 15 and further comprising final mode circuit means operatively coupled between said final mode means and said time segment display means for displaying said final mode signal on said time segment display means at the end of the final mode.

19. The computer as described in claim 15 and further comprising final mode circuit means operatively coupled between said final mode means and said mode display means for displaying said final mode signal on said mode display means at the end of the preset final mode.

20. The device as described in claim 15 and further comprising final mode alarm means operatively coupled to said final mode means and said final alarm means for audibly providing said final mode signal.

21. The computer as described in claim 15 and wherein said time segment display means includes a time segment LED driver and a time segment LED readout coupled to said LED driver for providing a real time display of the time segment in which the system is operating, and said mode display means includes a mode display LED driver coupled to the output of said diode matrix and a mode display readout coupled to said LED driver for providing a display of the mode in which the computer is operating and further including, first final mode circuit means coupled between said final mode means and said time segment display means for inhibiting said time segment LED driver and enabling said time segment LED readout to provide a display of said final mode signal, and second final mode circuit means coupled between said final mode means and said mode display means for inhibiting said mode display LED driver and enabling said mode display LED readout to provide a display of said final mode signal.

22. A computer for providing timing for a plurality of modes comprising:

signal means for generating signals at predetermined time segments, a plurality of automatic program means each operatively coupled to said signal means and corresponding to a specific mode and each presettable to provide timing for a predetermined number of time segments, mode control means coupled to said plurality of automatic program means for selecting one of said plurality of automatic program means in sequence for providing timing in each mode for a period of time segments corresponding to the setting of the selected automatic program means, mode display means operatively coupled to said mode control means for providing a display of the mode in which the computer is operating, final mode means operatively coupled to said automatic program means and said mode control means and presettable to provide selectivity in varying the last mode of operation of said plurality of automatic program means to provide a final mode signal at the end of the preset final mode, and a final mode circuit coupled between said final mode means and said mode display means to provide a display of said final mode signal at the expiration of the final mode.

23. The computer as described in claim 22 and wherein said final mode circuit includes:

a first NOR gate coupled between said final mode switch and said mode display means to inhibit the normal operation thereof, and a second NOR gate coupled between said final mode switch and said mode display means to enable said mode display means to provide a display of said final mode signal at the expiration of the final mode.

24. A computer for providing timing for a plurality of modes comprising:

signal means for generating signals at predetermined time segments, a plurality of automatic program means each operatively coupled to said signal means and corresponding to a specific mode and each presettable to provide timing for a predetermined number of time segments, mode control means coupled to said plurality of automatic program means for selecting one of said plurality of automatic program means in sequence for providing timing in each mode for a period of time segments corresponding to the setting of the selected automatic program means, final mode means operatively coupled to said automatic program means and said mode control means and presettable to provide selectivity in varying the last mode of operation of said plurality of automatic program means to provide a final mode signal at the end of the preset final mode, and final mode alarm means operatively coupled to said final mode means to provide an audible final mode signal.

25. The computer as described in claim 24 and wherein said final mode alarm means includes a NOR gate operatively coupled to timing means to provide a distinct audible final mode signal.

26. A computer for providing timing for a plurality of modes comprising:

signal means for generating signals at predetermined time segments, a plurality of automatic program means each operatively coupled to said signal means and corresponding to a specific mode and each presettable to provide timing for a predetermined number of time segments, mode control means coupled to said plurality of automatic program means for selecting one of said plurality of automatic program means in sequence for providing timing in each mode for a period of time segments corresponding to the setting of the selected automatic program means, counter reset circuit means operatively coupled between said mode control means and said signal means for resetting said signal means at the beginning of the selection of one of said plurality of automatic program means, and final mode means operatively coupled to said automatic program means and said mode control means and presettable to provide selectivity in varying the last mode of operation of the computer to provide a final mode signal at the end of the preset final mode.

27. The computer as described in claim 26 and wherein said counter reset circuit means includes at least two NAND gates, each having inputs coupled to alternate settings of the mode control means to provide a signal at the outputs thereof at the beginning of alternate modes, and timing means operatively coupled to the outputs of said two NAND gates to combine the outputs of said NAND gates to provide a reset signal to said signal means at the beginning of each mode.

28. A computer for providing timing for a plurality of modes comprising:

- signal means for generating signals at predetermined time segments,
- a plurality of automatic program means each operatively coupled to said signal means and corresponding to a specific mode and each presettable to provide timing for a predetermined number of time segments,
- mode control means coupled to said plurality of automatic program means for selecting one of said plurality of automatic program means in sequence for providing timing in each mode for a period of time segments corresponding to the setting of the selected automatic program means,
- a diode matrix operatively coupled to said mode control means to provide output signals corresponding to the mode in which the system is operating,
- mode display means coupled to said diode matrix for providing a display of the mode in which the system is operating, and
- final mode means operatively coupled to said automatic program means and said mode control means and presettable to provide selectivity in varying the last mode of operation of the computer to provide a final mode signal at the end of the preset final mode.

\* \* \* \* \*